United States Patent Office 3,262,783
Patented July 26, 1966

3,262,783
PRODUCTION OF A FOOD PRODUCT BY THE ENZYMATIC TREATMENT OF CEREAL GRAINS
Etienne Marie Joseph Blanchon, 85 Ave. de Villiers, Paris, France
No Drawing. Filed Feb. 8, 1963, Ser. No. 257,102
Claims priority, application France, Apr. 3, 1959, 791,108
7 Claims. (Cl. 99—1)

The present application is a continuation-in-part application of my co-pending application Serial Number 17,248 filed March 24, 1960, now abandoned, and entitled: "Food Product."

It is known that the laws of nutrition require that man, as well as animals, should find in their food two kinds of nutriments which are the energy-giving products as evaluated in calories and the plastic or protective elements such as the vitamins, the essential amino-acids, the trace elements, the list of which constantly becomes longer as science identifies elements which had previously been unknown. A synthetic food substance which appears to be a complete food at a given date, in the light of knowledge acquired at that date, is in fact deficient as compared with those elements which are still unknown on the date considered.

There are consequently only two natural foods which appear to be capable of overcoming this deficiency. These are the egg and the plant seed, which can of course be compared with a vegetable egg. Both must, in fact, necessarily contain all the essential nutriments both known and unknown, since they provide the embryos with all the elements which are necessary for their transformation into new living organisms.

However, a large number of persons such as those who are afflicted with liver ailments, must follow diets in which eggs are excluded. Such persons cannot therefore consume either eggs or any products of food industries in which eggs are employed, especially extruded-paste foods, side-dish or sweet and dessert-type preparations, custard-type foods and cakes and pastries.

It would appear wholly logical to assume that, in view of the nutritional analogy of the plant seed and the egg, it should be feasible to replace eggs by plant seeds in all cases in which eggs are contra-indicated. However, although such a substitution is the logical answer to the problem, it has not hitherto been possible to carry it into practical effect. In point of fact, nutritive elements are stored in plant seeds in a form which cannot be assimilated. And at the time of germination, substantial chemical transformation processes take place which tend to make these elements assimilable. Accordingly, there is first observed a simplification of the reserve substances of the kernel with, as a final result, the production of soluble substances which are capable of circulating in the interior of the seed. The said soluble substances are directed towards the germ which is in process of organization, following which there then takes place the synthesis of chemical substances in the plant.

This succession of phenomena develops, in addition to the reserves of the seed which constitute the raw material, enzymes which permit at the same time both the simplification and building-up of complex chemical substances which are present in the seed and in the plant.

These specific enzymes are numerous and are present chiefly, as far as cereals are concerned, in the pericarp and in the sub-jacent zone of the grains, that is to say in fact, during the mechanical transformation of the cereal grains for the purpose of producing flour, for example, in the whole of the brans, offals and middlings which constitute the by-products of flour-milling.

Apart from these enzymes, a large number of nutritive constituents which are valuable for the regeneration and formation of cellular elements both of man and animals are included, as is already known, in the highly cutinized cells, the cellulose membranes of which are bonded together by a pectic cement and are located inside the sheaths and in the cortical portions of cereal grains.

In order to liberate enzymes and nutritive constituents, it is first of all necessary to effect the opening of these cellulosic cells and the liberation of their contents. In point of fact, as far as the grains of cereals are concerned, human organisms are incapable of obtaining this result during digestion. In fact, brans pass through the human digestive tract without in practice being degraded by the digestive juices, with the result that they serve no useful purpose as a food.

On the contrary, the brans play a harmful part on account of the large quantity of cellulose of which they are composed. In fact cellulose has a detrimental effect, especially insofar as it fixes by adsorption a certain quantity of digestive enzymes which are produced by the human organism and which are eliminated at the same time as the cellulose which thus despoils the individual which it is intended to nourish.

Mechanical processes for the micronization of brans by crushing cannot for this reason be put to use, and the same applies to chemical processes, which cannot be employed in the manufacture of food products.

It is also known to produce the opening of cellulose cells by enzymatic hydrolysis of the pectic cements.

A hydrolysis process of this type is carried out in the present state of the art by means of pectinolytic enzymes of bacterial or fungic origin which are available in commerce. But this very origin is attended by disadvantages: in the first place, in a number of countries, internal legislation prevents the use of such preparations in food industries; and on the other hand, recent researches have shown the highly specific action of the enzymes contained in the brans of various cereals such as the brans of wheat, Indian corn or rice, for example, with the result that the quantities of amino-acids found in the various kinds of cereals are not the same. It is also known that the pectoses in the pectins produced by the various vegetable species can have more or less marked differences.

In fact, as a result of said recent researches, extremely active pectinolytic ferments have been found to exist in the brans of cereals.

In order to ensure that the pectic cements referred to above are hydrolyzed under the best conditions, it is therefore necessary to subject the brans to the action of pectinases which have the same origin as the said husks.

Accordingly, the present invention has for its object to obtain enzymatic preparations which are rich in pectinases, the said pectinases being suitable for the purpose of hydrolyzing the pectic cements which enclose the cellulosic cells.

A further object of the invention is the recovery of nutritive and active elements which are present in the cellulosic cells.

The invention also has for its object the preparation of food products and dietary products which are constituted by the nutritive and active elements liberated from the said cellulosic cells, or which contain the said elements.

There exist enzymatic preparations which are derived from cereal grains and which are known by the name of "malt."

The malted products which are available industrially are of two kinds: the paste or dry extracts, and malt flour. In order to prepare the extracts, barley is employed exclusively as a starting cereal. In order to prepare flour, wheat is also used sometimes in addition to barley.

In order to obtain malt flour, the grains are first steeped in water for a period of approximately two days, following which the conditions of germination are established. At the end of a germination period of 5 to 8 days, the said germination process is stopped and the grains are stabilized by carrying out the kilning process. There are thus obtained grains which contain only a very low percentage of moisture and which are then ground and converted to flour.

In order to manufacture malt extracts, the grain is subjected to a coarse-grinding operation and, without separating the brans, offals and middlings, a mash is prepared at a temperature of approximately 70° C., which is the optimum temperature of action of the α- and β-amylases, the action of which is mainly sought in the industrial uses of malt.

The malted products only have a small proteolytic activity, however, whereas the presence of pectinases has never been observed.

The reason for this lies in the relatively high temperatures to which the grain is subjected in the malting process.

Infact it is well known that the optimum temperature of action of the pectinases (pectin-esterase and pectin-polygalacturonase) is located between 8 and 10° C. and that the said pectinases are inactivated above 55° C.

On the other hand, the optimum temperature of the amylases is located at 70° C. However, it is known that in the malting process the action of the amylases is predominant, so that 70° C. constitutes a minimum temperature of the cereal grains in the malting process.

The present invention is accordingly directed to a process for the preparation of a food product, the said process comprising the following steps:

(a) During a first stage, there is obtained an enzymatic preparation by subjecting cereal grains to conditions of germination, then by subjecting the said cereal grains, as and when the germination of the said grains has just commenced, to a physical treatment of separation of the cellulose constituent of the grain, which is eliminated, from a liquid constituent which forms the above-mentioned enzymatic preparation;

(b) During a second stage, brans, offals and middlings which constitute by-products of flour-milling or rice-milling, etc., of the same cereal species as the grains treated in stage (a) for the purpose of obtaining the enzymatic preparation, are subjected to the action of the said enzymatic preparation under conditions, especially of temperature, which are conducive to the action of the different enzymes contained in the said enzymatic preparation, and especially the pectinolytic enzymes, proteolytic enzymes and amylolytic enzymes;

(c) During a third stage, the nutritive and active elements which are liberated from the cellulose cells of the brans, offals and middlings as treated by the enzymatic preparation during stage (b) are separated from the undesirable cellulose, the combined assembly of the said nutritive and active elements thus constituting in themselves a food product.

According to one form of embodiment of the invention, which is given by way of representative example and not in any limitative sense:

(a) An enzymatic preparation is obtained by inducing the germination of a certain quantity of grains of the cereal which has been chosen, in a proportion, for example, of 5% by weight approximately of the quantity of brans, offals and middling which it is intended to subject to the action of the enzymatic preparation, under the conditions of moisture, temperature, ventilation and light which are usual for each species, then by allowing the germination process to develop for a relatively short period of time of the order of 12 to 24 hours, for example, in the case of wheat, and then, when the swelling of the grains has been achieved but without opening of these latter (as usually takes place when the radicle develops outside the germ), by crushing the swollen grains in a pre-determined quantity of water in order to obtain a liquid paste, the temperature being maintained in the vicinity of 15° C., and, finally, by subjecting the paste thus obtained to a physical treatment of separation of the ligno-cellulose on the one hand and, on the other hand, of a liquid which constitutes the enzymatic preparation.

(b) The nutritive and active elements, especially enzymatic elements, which are contained in the cellulose cells of the by-products, as brans, offals and middlings, of flour-milling (or of rice-milling, etc.) of the same cereal species as that from which is derived the enzymatic preparation obtained in stage (a), are liberated by subjecting a fraction of the by-products of flour, namely the brans and middlings, that is to say the portion which is separated from the grinding if the yield of "ordinary white" flour is 75%, to the action of the enzymatic preparation obtained in stage (a), for a period of 1 to 1½ hours, after the said bran and middlings have been formed into a paste by addition of water, the temperature of action of the enzymatic preparation being preferably maintained between 10 and 20° C., following which the undesirable cellulose is then separated, either by filtering, drying, decantation or any other suitable mode of separation, from the liquid which contains in solution and in suspension the greater part of the nutritive and active elements which are liberated from the cellulose cells of the said fraction of milling by-products.

(c) The food product in accordance with the invention is prepared by subjecting a second fraction of the milling by-products, namely "low-grade flour," that is to say the additional portion which is separated from the grinding when the yield of "ordinary white" flour is 71%, to the action of the liquid which is rich in the nutritive and active elements obtained in stage (b) for a period of approximately 1½ hours under the following conditions: during the first half hour, the temperature is of the order of 20° C. which is the optimum temperature of action of the pectinolytic enzymes; during the second half hour, temperature is brought to 50° C., which is the optimum temperature of action of the proteolytic enzymes, and during the third half hour, the temperature is brought to 70° C., which is the optimum temperature of action of the amylolytic enzymes, following which the temperature is brought to 100° C. for a short time in order to stop the action of the enzymes.

The food product obtained can be employed in liquid form if consumed immediately; it can also be dried and stored on condition that the moisture content thereof is not in excess of 12%. The said food product can be employed as it stands or else it can be incorporated with food preparations for the purpose of replacing eggs, or for the purpose of improving the digestibility of certain food products, or else it can be employed for the preparation of dietary products.

According to an alternative form of stage (c) of the process which has been described in the foregoing, the temperature to which the "low-grade flour" is subjected is uniformly of the order of 50° C. during the entire time of the enzymatic action. This temperature corresponds to the maximum limit of potential action of the pectinases, and also to the optimum temperature of action of the proteins as well as to the bottom limit of potential action of the amylases.

According to an advantageous arrangement of the process in accordance with the invention, the pH value of the various stages of the process is maintained in the vicinity of pH 6.5.

In order to prepare food products containing the product which is obtained by working up the process in accordance with the invention, various possibilities are offered, among which the following can be mentioned in particular:

*Preparation of custard-type foods.*—In order to prepare custard-type foods, an average of 60 cubic centimetres of the product obtained in accordance with the invention is employed per litre of milk. Sugar and flavouring is added as required, the subsequent procedure being the same as in the preparation of an egg custard. The milk employed can be either skimmed milk or not, or powdered milk, whether skimmed or not. The custard can then be dried after preparation, in order to permit of its preservation.

*Preparation of extruded-paste foods.*—At the moment of doughing-in or blending of the paste, the food product in accordance with the invention is added to the semolina flour. When the dry extract of the said food product is employed, this latter is added in a proportion of approximately 7% so as to restore the natural proportion of cortical zone to kernel which has been modified as a result of the fact that the cellulose has been eliminated. The production of the extruded-paste food is then continued as in the case of an ordinary paste.

*Preparation of yoghurt (yaourt).*—The dry product which is prepared in accordance with the provisions of the present invention is admixed with milk which has been boiled down in the normal manner, following which the process of inoculation with ferment and other operations are carried out in accordance with the usual technique. The quantity of dry food product in accordance with the invention which it is necessary to add is preferably 5 cubic centimetres for the quantity of milk required for the production of one pot of yoghurt of 12 centilitres capacity.

*Improvement of different foods.*—The food product obtained by making use of the product in accordance with the present invention improves the digestibility of different foods such as bread, rusks (biscottes), biscuits, for example, to which it will be found an advantage to add the said product, whether in the dry state or not. While improving their digestibility, the product in accordance with the invention enriches these foods with nutritive and active elements, the result thereby achieved being to increase their nutritive quality.

What I claim is:

1. A process for the preparation of a food product which comprises in combination the following successive stages:
  (a) obtaining an enzymatic preparation by subjecting cereal grains to germination conditions, then subjecting said cereal grains when their germination has just barely started to a physical treatment for the separation of the cellulosic constituent of the grain which is eliminated and a liquid constituent which constitutes said enzymatic preparation;
  (b) then placing said liquid constituent which constitutes an enzymatic preparation rich in pectinases obtained from stage (a) in contact with the sharps of the grains of the same cereal species as the grains treated in stage (a), hydrolyzing the pectic cement of the cellulosic walls of the cells which form said sharps at a temperature from 10° to 70° C., then separating by physical means the nutritive and active elements freed by the action of the enzymatic preparation rich in pectinases obtained in stage (a) upon said sharps from the cellulose which was bound prior to said hydrolysis to form a desired product.

2. Process for the preparation of a food product which comprises in combination the following successive stages:
  (a) obtaining an enzymatic preparation rich in pectinolytic, proteolytic, and amylolytic enzymes by causing the germination of wheat grains under the usual conditions of humidity, temperature, aeration and light, allowing the germination to develop during a time which brings about swelling but not the opening of the grains and which is of the order of 12 to 24 hours, then crushing said grains in a quantity of water sufficient to obtain a liquid paste and then subjecting said paste to a physical treatment for the separation of the ligno-cellulose and a liquid phase which forms said enzymatic preparation, the temperature being maintained at about 15° C. during the totality of stage (a);
  (b) subjecting the sharps of wheat grains to the action of said enzymatic preparation obtained in stage (a) above to the following stages:
  (c) the fraction of the sharps constituted by the bran and the sharps having about 14% of cellulose, which is the fraction separated by the milling when the extraction portion of the wheat flour is 75%, is subjected to the action of said enzymatic preparation obtained in stage (a) above, then separating physically the undesirable cellulose of the liquid phase which contains the major portion of the nutritive and active elements freed from the cellulosic cells of said fraction of said sharps which forms the desired product and then adding said liquid phase to food products to improve the assimilability and nutritive properties, the temperature being maintained between 10 and 20° C. during stage (c).

3. A process for the preparation of a food product which comprises in combination the successive following stages:
  (a) obtaining an enzymatic preparation rich in pectinolytic, protetolytic, and amylolytic enzymes by causing the germination of wheat grains under conditions of the usual humidity, temperature, areation and light, allowing the germination to develop during a time which brings about swelling but not the opening of the grains and which is of the order of 12 to 24 hours, then crushing said grains in a quantity of water sufficient to obtain a liquid paste and then subjecting said paste to a physical treatment for the separation of the ligno-cellulose and a liquid phase which forms said enzymatic preparation, the temperature being maintained at about 15° C. during the totality of stage (a);
  (b) subjecting the sharps of wheat grains to the action of said enzymatic preparation obtained in stage (a) to the following stages:
  (c) the fraction of the sharps constituted by the bran and the sharps having about 14% of cellulose which is the fraction separated by milling when the extraction portion of wheat flour is 75%, is subjected to the action of said enzymatic preparation obtained in stage (a) separating physically the undesirable cellulose of a liquid phase which contains the major portion of the nutritive and active elements freed from the cellulosic cells of said fraction of sharps, the temperature being maintained between 10° C. and 20° C. during the entire stage (c);
  (d) subjecting for about one and one half hours a second fraction of said sharps which is the supplementary portion separated by milling when the portion of extraction of wheat flour is 71%, to the action of said liquid rich in nutritive and active elements obtained in stage (c), the temperature of stage (c) being about 20° C. during the first half hour wherein pectinolytic enzyme action occurs, about 50° C. during the second half hour for proteolytic enzyme action and about 70° C. during the third half hour wherein amylolytic enzyme action takes place, then eliminating the undesirable cellulose by physical separation to recover the desired food product sought which can be used alone or in association with other food products to improve them.

4. Process for the preparation of a food product which comprises in combination the following successive stages:
  (a) obtaining an enzymatic preparation rich in pectinolytic, proteolytic, and amylolytic enzymes by causing the germination of wheat grains under the usual conditions of humidity, temperature, aeration and light, allowing said germination to develop during a time which brings about swelling but not the opening of the grains and which is of the order of 12 to 24 hours, then crushing said grains in a quantity of water sufficient to obtain a liquid paste and then subjecting said paste to a physical treatment for the separation of the ligno-cellulose and a liquid phase which forms said enzymatic preparation, the temperature being maintained at about 15° C. during the totality of stage (a);

(b) subjecting the sharps of wheat grains to the action of said enzymatic preparation obtained in stage (a) according to the following stages:

(c) the fraction of the sharps constituted by the bran and the sharps having about 14% of cellulose, when the extraction portion separated by milling of wheat flour is 75%, is subjected to the action of said enzymatic preparation obtained in stage (a), then separating by a physical treatment the undesirable cellulose of a liquid phase which contains the major portion of the nutritive and active elements freed from the cellulosic cells of said fraction of sharps, the temperature being maintained between 10° C. and 20° C. during the entire stage (c);

(d) subjecting for about one and one half hours a second fraction of said sharps, to the action of said liquid rich in nutritive and active elements obtained in stage (c), the temperature of stage (c) being about 20° C. during the first half hour wherein pectinolytic enzyme action occurs, about 50° C. during the second half hour for proteolytic enzyme action and about 70° C. during the third half hour wherein amylolytic enzyme action takes place, then eliminating the undesirable cellulose to recover the food product sought and then stabilizing said product by subjecting said product for a brief time to a temperature of the order of 100° C.

5. Process for the preparation of a food product which comprises in combination the following successive stages:

(a) obtaining an enzymatic preparation rich in pectinolytic, proteolytic, and amylolytic enzymes by causing the germination of wheat grains under the usual conditions of humidity, temperature, aeration and light, allowing the germination to develop during a time which brings about swelling but not the opening of the grains and which is of the order of 12 to 24 hours, then crushing said grains in a quantity of water sufficient to obtain a liquid paste and then subjecting said paste to a physical treatment for the separation of the ligno-cellulose and a liquid phase which forms said enzymatic preparation, the temperature being maintained at about 15° C. during the totality of stage (a);

(b) subjecting the sharps of wheat grains to the action of said enzymatic preparation obtained in stage (a) to the following stages:

(c) the fraction of sharps constituted by the bran and the sharps having about 14% of cellulose, when the extraction portion separated by milling of wheat flour is 75%, is subjected to the action of said enzymatic preparation obtained in stage (a), then separating by a physical treatment the undesirable cellulose of a liquid prase which contains the major portion of the nutritive and active elements freed from cellulosic cells of said fraction of sharps, the temperature being maintained between 10° and 20° C. during the entire stage (c);

(d) subjecting for about one and one half hours a second fraction of said sharps, to the action of said liquid rich in nutritive and active elements obtained in stage (c), the temperature of stage (d) being maintained at about 50° C. during the entire time of action of said liquid, then eliminating the undesirable cellulose to recover food product sought.

6. Process for the preparation of a food product according to claim 1 wherein the pH of the process is maintained at about 6.5 throughout the entirety of the stages.

7. A new product as obtained from the process of claim 1.

References Cited by the Examiner

UNITED STATES PATENTS

| | | | |
|---|---|---|---|
| 1,080,920 | 12/1913 | Muller | 99—59 |
| 1,247,349 | 11/1917 | Wahl et al. | 99—90 |
| 1,266,201 | 5/1918 | Boddington | 99—139 |
| 1,271,371 | 7/1918 | Roush. | |
| 2,009,274 | 7/1935 | Quasching et al. | 99—90 |
| 2,494,544 | 1/1950 | Erlich | 99—80.1 |
| 3,157,513 | 11/1964 | Allen | 99—80.1 X |

OTHER REFERENCES

Pyler, Baking Science and Technology, vol. I, 1952, Siebel Publishing Co. (Chicago), pages 274 to 277.

A. LOUIS MONACELL, *Primary Examiner.*

R. N. JONES, *Assistant Examiner.*